US008482166B2

(12) United States Patent
Chamberlin et al.

(10) Patent No.: US 8,482,166 B2
(45) Date of Patent: Jul. 9, 2013

(54) ELECTRIC MACHINE SYSTEM INCLUDING AN ALTERNATING CURRENT (AC) ELECTRIC MACHINE HAVING AN EXPANDABLE COOLANT MANIFOLD

(75) Inventors: Bradley D. Chamberlin, Pendleton, IN (US); Alex Creviston, Muncie, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 311 days.

(21) Appl. No.: 12/939,313

(22) Filed: Nov. 4, 2010

(65) Prior Publication Data
US 2012/0112573 A1  May 10, 2012

(51) Int. Cl.
*H02K 9/00* (2006.01)
*H02K 9/20* (2006.01)
*F25D 23/12* (2006.01)
*F25D 17/02* (2006.01)

(52) U.S. Cl.
USPC ............... 310/52; 310/54; 310/59; 62/259.2; 62/434

(58) Field of Classification Search
USPC .................. 310/52, 54, 59; 62/259.2, 434
See application file for complete search history.

(56) References Cited

U.S. PATENT DOCUMENTS

| | | | | |
|---|---|---|---|---|
| 5,678,646 | A * | 10/1997 | Fliege | 180/65.1 |
| 6,561,576 | B2 * | 5/2003 | Breymaier | 296/214 |
| 6,626,652 | B2 * | 9/2003 | Koyama et al. | 417/423.1 |
| 7,567,053 | B2 | 7/2009 | Hauenstein | |
| 7,638,910 | B2 * | 12/2009 | Akita et al. | 310/68 D |
| 7,679,234 | B1 | 3/2010 | Tilton et al. | |
| 2002/0073729 | A1 * | 6/2002 | Shibuya | 62/505 |
| 2006/0043803 | A1 * | 3/2006 | Yagi | 310/68 B |
| 2006/0174642 | A1 | 8/2006 | Nagashima et al. | |
| 2007/0084227 | A1 * | 4/2007 | Haapamaki | 62/259.2 |
| 2008/0225482 | A1 * | 9/2008 | Smith et al. | 361/699 |
| 2010/0283252 | A1 * | 11/2010 | Fradella | 290/55 |

FOREIGN PATENT DOCUMENTS

JP  2008252975 A  10/2008

OTHER PUBLICATIONS

International Search Report and Written Opinion for PCT Application No. PCT/US2011/058236, dated May 15, 2012, pp. 1-9.
International Preliminary Report on Patentability for PCT Application No. PCT/US2011/058236, dated May 16, 2013, pp. 1-6.

* cited by examiner

*Primary Examiner* — Tran Nguyen
*Assistant Examiner* — Terrance Kenerly
(74) *Attorney, Agent, or Firm* — Cantor Colburn LLP

(57) ABSTRACT

An electric machine system including an alternating current (AC) electric machine. The AC electric machine includes a machine housing having a machine portion and a switch portion. A stator is fixedly mounted in the machine portion of the machine housing, and a rotor rotatably mounted relative to the stator. A switch assembly is arranged within the switch portion of the machine housing and electrically connected to the stator. The switch assembly includes a switch module having a switch member. The switch module is configured and disposed to be detachably mounted in the switch portion of the machine housing. A cooling system that includes an expandable coolant manifold is arranged in the switch portion of the machine housing. The expandable coolant manifold is fluidly connected to the switch module.

16 Claims, 2 Drawing Sheets

ELECTRIC MACHINE SYSTEM INCLUDING AN ALTERNATING CURRENT (AC) ELECTRIC MACHINE HAVING AN EXPANDABLE COOLANT MANIFOLD

BACKGROUND OF THE INVENTION

Exemplary embodiments pertain to the art of electric machines and, more particularly, to a cooling manifold for an electric machine having an integrated switching mechanism.

Conventional electric motor systems, such as those used in automotive, agricultural, and other heavy duty applications where electric and hybrid motors are employed, include an electric motor operatively coupled to an inverter through high voltage cabling. A typical inverter includes a controller portion and a multi-phase power switching portion. The multi-phase power switching portion includes various high voltage components such as insulated gate bipolar transistors (IGBTs), metal oxide semiconductor field effect transistors (mosfets), rectifiers, capacitors, inductors, high voltage wiring and the like. The inverter is electrically connected to an engine control module, a high voltage battery, and the electric motor. The connections between the inverter and the battery, and the inverter and the electric motor, require high voltage cabling. In addition, the inverter is also typically connected to a cooling system. Cooling systems for inverters include a fluid coolant such as oil, water, air or other media that can absorb and retain heat.

BRIEF DESCRIPTION OF THE INVENTION

Disclosed is an electric machine system including an alternating current (AC) electric machine. The AC electric machine includes a machine housing having a machine portion and a switch portion. A stator is fixedly mounted in the machine portion of the machine housing, and a rotor rotatably mounted relative to the stator. A switch assembly is arranged within the switch portion of the machine housing and electrically connected to the stator. The switch assembly includes a switch module having at least one switch member. The switch module is configured and disposed to be detachably mounted in the switch portion of the machine housing. A direct current (DC) power source is electrically connected to the stator through the switch assembly. A controller is operatively connected to the switch assembly. The controller is configured and disposed to operate the switch assembly to convert direct current from the DC power source to an alternating current to operate the AC electric machine. A cooling system that includes an expandable coolant manifold is arranged in the switch portion of the machine housing. The expandable coolant manifold is fluidly connected to the at least one switch module.

Also disclosed is an alternating current (AC) electric machine including a machine housing having a machine portion and a switch portion. A stator is fixedly mounted in the machine portion of the machine housing and a rotor is rotatably mounted relative to the stator. A switch assembly is arranged within the switch portion of the machine housing and electrically connected to the stator. The switch assembly includes a switch module having at least one switch member. The switch module is configured and disposed to be detachably mounted in the switch portion of the machine housing. A cooling system that includes an expandable coolant manifold is arranged in the switch portion of the machine housing. The expandable coolant manifold is fluidly connected to the at least one switch module.

Further disclosed is a method of connecting an alternating current (AC) electric machine having a machine housing including a machine portion and a switch portion. The method includes installing a switch module into the switch portion of the machine housing, connecting the switch module to a stator arranged in the machine portion of the switch housing and first and second power terminals arranged on the machine housing. The method further includes fluidly connecting an expandable coolant manifold to the switch module.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
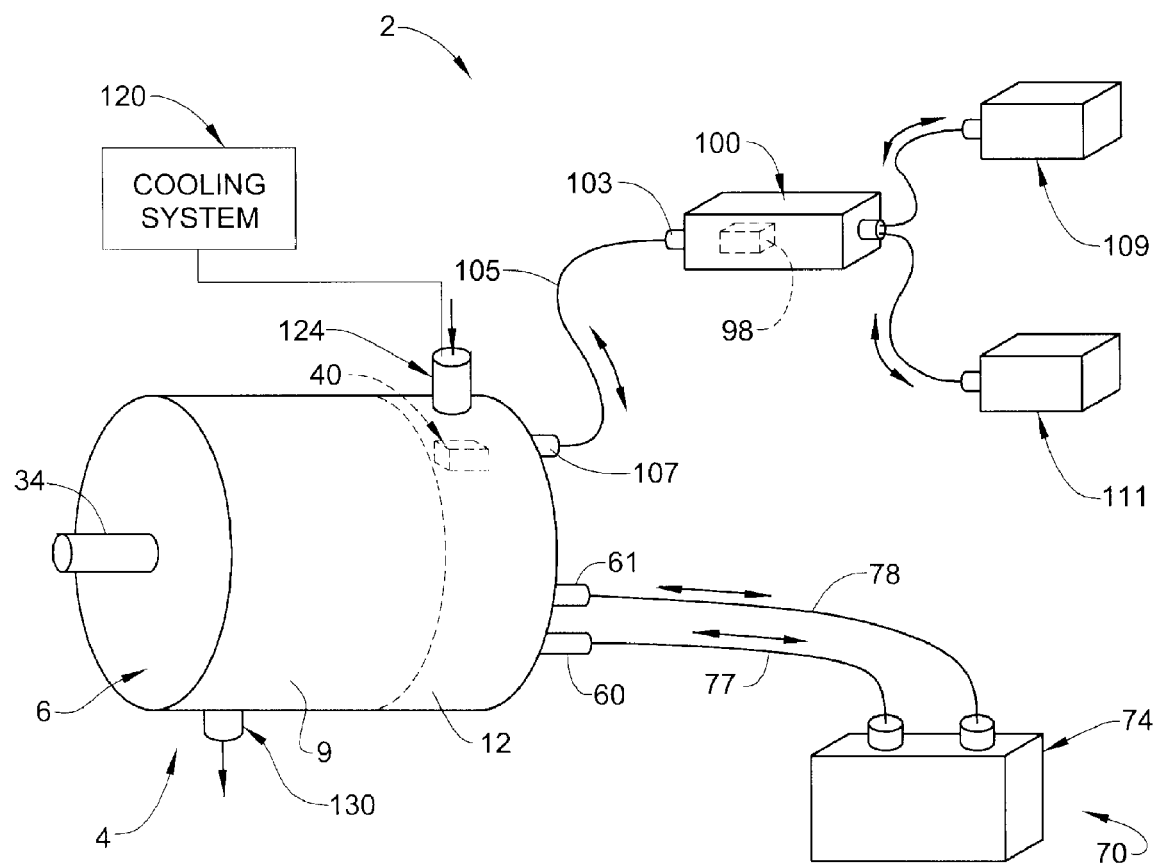
FIG. 1 depicts an electric machine system including an alternating current (AC) electric machine having an expandable coolant manifold in accordance with an exemplary embodiment.
Figure 2:
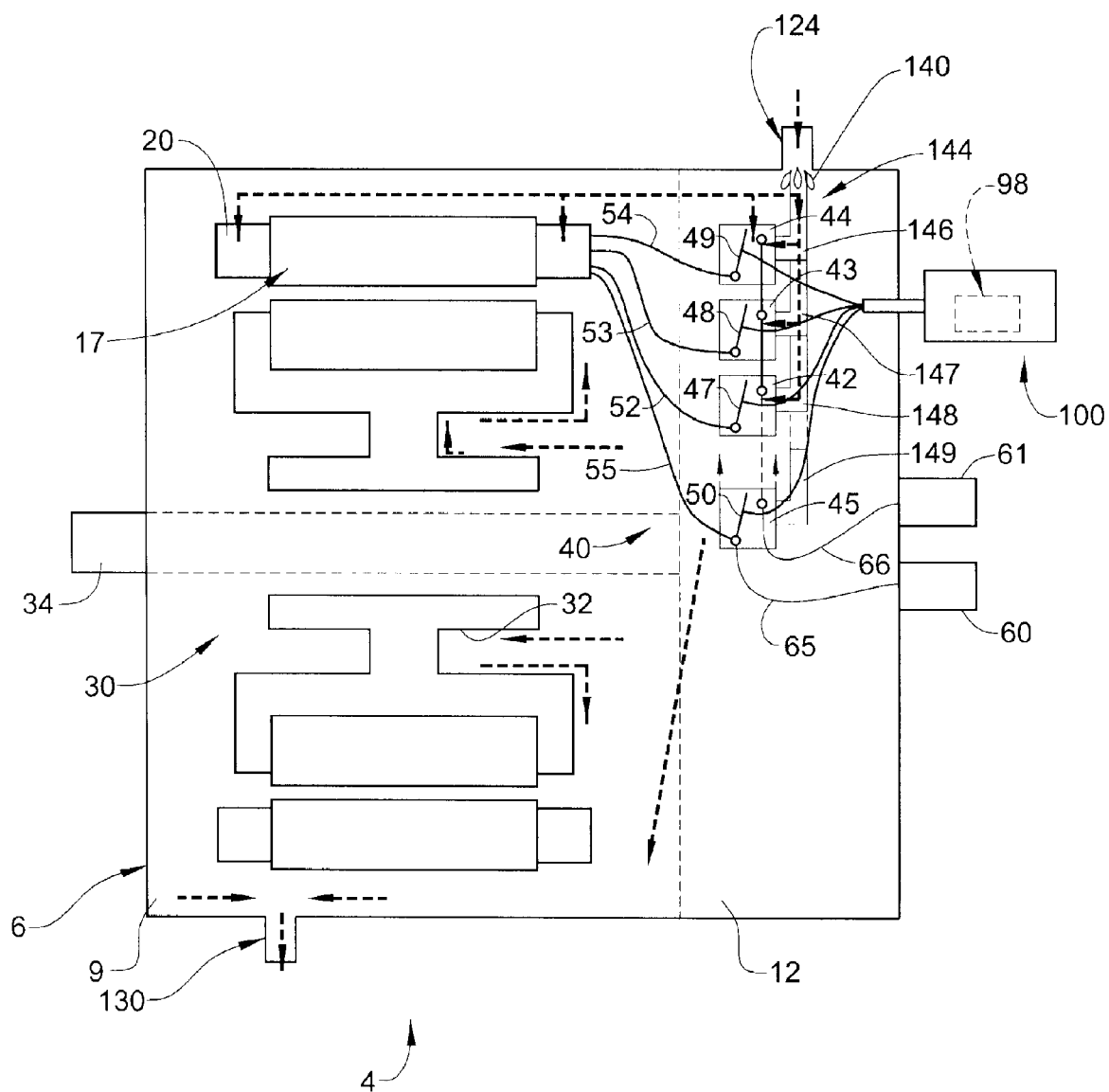
FIG. 2 is a cross-sectional schematic view of the AC electric machine of FIG. 1.

With reference to FIGS. 1 and 2, an electric machine system constructed in accordance with an exemplary embodiment is indicated generally at 2. Electric machine system 2 includes an alternating current (AC) electric machine shown in the form of an electric motor 4 having a machine housing 6. Machine housing 6 includes a machine portion 9 and a switch portion 12. In the exemplary embodiment shown, machine portion 9 includes a stator assembly 17 having a plurality of windings 20. Windings 20 define a number of phases for AC electric motor 4. More specifically, AC electric motor 4 constitutes a multi-phase AC electric motor. Machine portion 9 is also shown to include a rotor assembly 30 having a rotor hub 32 that is operatively coupled to an output shaft 34. At this point, it should be understood that the electric machine in accordance with the exemplary embodiment could take the form of an electric motor, i.e., an electric machine provided with an electric current input to produce a mechanical output or an electric generator, i.e., an electric machine provided with a mechanical input that is transformed into an electrical current.

In accordance with an exemplary embodiment, switch portion 12 of machine housing 6 includes a switch assembly 40. As will be discussed more fully below, switch assembly 40 is operated to convert direct current (DC) from a DC power source to an alternating current to power AC electric motor 4. In accordance with an exemplary embodiment, switch assembly 40 includes a plurality of switch modules 42, 43, and 44. Each switch module 42-44 is detachably mounted within switch portion 12 of machine housing 6. More specifically, in the event of a switch failure, each switch module 42-44 may be selectively individually replaced. In this manner, failure of a single switch module will not require a complete replacement of switch assembly 40. In the exemplary embodiment shown, an additional switch module 45 is shown being added into AC electric motor 4. Each switch module 42-44, and 45 includes a corresponding switch member 47, 48, 49, and 50.

Switch members 47-50 are selectively activated (opened/closed) to establish multiple phases for AC electric motor 4.

More specifically, switch member 47 of switch module 42 establishes a first phase for AC electric motor 4. Switch member 48 of switch module 43 establishes a second phase for AC electric motor 4, and switch member 49 of switch module 44 establishes a third phase for AC electric motor 4. Switch module 45 establishes a second pole of, for example the first phase. Additional switch modules (not shown) would establish the second and third poles of the second and third phases respectively.

In the embodiment shown, switch module 42 is electrically connected to a first phase (not separately labeled) of windings 20 through a first high voltage conductor 52, switch module 43 is electrically connected to a second phase (not separately labeled) of windings 20 through a second high voltage conductor 53, and switch module 44 is electrically connected to a third phase (not separately labeled) of windings 20 through a third high voltage conductor 54. Switch module 45 is electrically connected to a second pole (not shown) of the first phase through a high voltage conductor 55. Switch modules 42-45 are also connected to a pair of power terminals 60 and 61 through a corresponding pair of high voltage power conductors 65 and 66. "High voltage" should be understood to mean any voltage shared between electric AC motor 4 and a power supply. In accordance with one exemplary aspect, "high voltage" is voltage in a range of between about 100 volts to about 1000 volts. Voltage should be understood to include voltage supplied by switch assembly 40 to the electric machine when operated in a motor mode or passed to switch assembly 40 when the electric machine is operated in a generator mode. In general, voltage should be understood to include energy that is exchanged between the electric machine and inverter assembly 40 resulting in a transformation of energy between a mechanical and electrical state. Power terminals 60 and 61 are also electrically connected to a direct current (DC) power source 70, shown in the form of a high voltage battery 74, by high voltage cables 77 and 78. Thus, in the exemplary embodiment shown, AC electric motor 4 is provided power by DC power source 62. Although shown with four switch modules, it should be understood that the number and type of switch modules can vary.

Electric machine system 2 is shown to include a controller 98 that is electrically connected to switch assembly 40. Controller 98 electrically activates (opens/closes) switch modules 42-44 to transform DC electrical current from DC power source 70 to a multi-phase AC electric current that is used to power AC electric motor 4. Controller 98 is arranged within a controller housing 100 that is remote from AC electric motor 4. Controller housing 100 includes a control terminal 103 that electrically connects controller 98 to AC electric motor 4. More specifically, controller 98 is linked to switch assembly 40 by a low voltage cable 105 that extends between control terminal 103 and a control terminal element 107 provided on machine housing 6. "Low voltage" should be understood to mean voltage shared between controller 98 and switch assembly 40 employed to achieve a change in state, e.g., open/close, switch members 47-50. In accordance with one aspect of the exemplary embodiment, "low voltage" constitutes voltage in a range of between greater than about 0 volts and about 99 volts. Electric machine system 2 is also includes a control module 109 electrically connected to controller 98. Control module 109 establishes a desired operational speed for AC electric motor 4. Controller 98 is also shown linked to additional control inputs 111 could also include accessory control modules, or other vehicle operational parameters such as torque, speed, power and the like.

Electric machine system 2 is further shown to include a cooling system 120. Cooling system 120 includes a coolant input port 124 and a coolant output port 130 that are fluidly connected to machine housing 6. Coolant input port 124 directs a coolant 140, such as air, oil, water, a glycol mixture, or the like toward switch portion 12 of AC electric motor 4. In accordance with the exemplary embodiment, cooling system 120 includes an expandable coolant manifold 144 that is fluidly connected to coolant input port 124. Expandable coolant manifold 144 includes first coolant branch 146 that is fluidly connected to coolant input port 124 and switch module 44. First coolant branch 146 directs the coolant in thermally conductive proximity to switch member 49. Expandable coolant manifold also includes a second coolant branch 147 that is detachably, fluidly, connected to first coolant branch 146 and switch module 43. Second coolant branch 147 directs the coolant in thermally conductive proximity to switch member 48. A third coolant branch 148 is detachably, fluidly connected to second coolant branch 147 and switch module 42. Third coolant branch 148 directs the coolant in thermally conductive proximity to switch member 47. Finally, a fourth coolant branch 149 is shown being connected to third coolant branch 148 and switch module 45. Fourth coolant branch 149 directs the coolant in thermally conductive proximity to switch member 50. While shown with four coolant branches, the number, geometry, and orientation of the coolant branches can vary without departing from the scope of the exemplary embodiment.

With this arrangement, each switch module is provided with a distinct cooling circuit. In this manner, new switch modules can be readily added to existing switch modules and/or existing switch modules can be readily replaced. In addition to providing for rapid repair/restructuring, the exemplary embodiment provides a flexible system that allows designers to make rapid changes to existing machines without requiring costly rebuilding/re-tooling to change from one machine design to another.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine system comprising:
    an alternating current (AC) electric machine including a machine housing having a machine portion and a switch portion, a stator fixedly mounted in the machine portion of the machine housing, a rotor rotatably mounted relative to the stator, and an switch assembly arranged within the switch portion of the machine housing and electrically connected to the stator, the switch assembly including a switch module having at least one switch member;
    a direct current (DC) power source electrically connected to the stator through the switch assembly;
    a controller operatively connected to the switch assembly, the controller being configured and disposed to operate the switch assembly to convert direct current from the DC power source to an alternating current to operate the AC electric machine; and
    a cooling system including an expandable coolant manifold arranged in the switch portion of the machine housing, the expandable coolant manifold including a coolant branch having an inlet passage portion and an outlet passage fluidly connected to the at least one switch module, the inlet passage portion being configured and disposed to join with another inlet passage portion provided on another coolant branch to form a continuous inlet passage.

2. The electric machine system according to claim 1, wherein the switch module includes a plurality of switch modules, the expandable coolant manifold being fluidly connected to each of the plurality of switch modules.

3. The electric machine according to claim 2, wherein the plurality of switch modules includes a first switch module, a second switch module and a third switch module.

4. The electric machine system according to claim 3, wherein the expandable coolant manifold includes a first coolant branch that is fluidly connected to the first switch module, a second coolant branch that is fluidly connected to the second switch module, and a third coolant branch that is fluidly connected to the third switch module.

5. The electric machine system according to claim 4, wherein the second coolant branch is configured and disposed to be detachably connected to the first coolant branch and the third coolant branch is configured and disposed to be detachably connected to the second coolant branch.

6. An alternating current (AC) electric machine comprising:
 a machine housing having a machine portion and a switch portion;
 a stator fixedly mounted in the machine portion of the machine housing;
 a rotor rotatably mounted relative to the stator;
 a switch assembly arranged within the switch portion of the machine housing and electrically connected to the stator, the switch assembly including a switch module having at least one switch member; and
 a cooling system including an expandable coolant manifold arranged in the switch portion of the machine housing, the expandable coolant manifold including a coolant branch having an inlet passage portion and an outlet passage fluidly connected to the at least one switch module, the inlet passage portion being configured and disposed to join with another inlet passage portion provided on another coolant branch to form a continuous inlet passage.

7. The AC electric machine according to claim 6, wherein the switch module includes a plurality of switch modules, the expandable coolant manifold being fluidly connected to each of the plurality of switch modules.

8. The AC electric machine according to claim 7, wherein the plurality of switch modules includes a first switch module, a second switch module and a third switch module.

9. The AC electric machine according to claim 8, wherein the expandable coolant manifold includes a first coolant branch that is fluidly connected to the first switch module, a second coolant branch that is fluidly connected to the second switch module, and a third coolant branch that is fluidly connected to the third switch module.

10. The AC electric machine according to claim 9, wherein the second coolant branch is configured and disposed to be detachably connected to the first coolant branch and the third coolant branch is configured and disposed to be detachably connected to the second coolant branch.

11. A method of connecting an alternating current (AC) electric machine having a machine housing including a machine portion and a switch portion, the method comprising:
 installing a first switch module and a second switch module into the switch portion of the machine housing;
 connecting the switch module to a stator arranged in the machine portion of the switch housing and first and second power terminals arranged on the machine housing; and
 connecting a first coolant branch of an expandable coolant manifold to the first switch module, the first coolant branch having a first inlet passage portion and an outlet passage fluidly connected to the first switch module; and
 connecting a second coolant branch of the expandable coolant manifold to the second switch module, the second coolant branch including a second inlet passage portion and a second outlet fluidly connected to the second switch portion, the second inlet passage portion being connected to the first inlet passage portion to form a continuous inlet passage.

12. The method of claim 11, further comprising: passing coolant through the coolant manifold into the switch module.

13. The method of claim 11, further comprising: passing coolant through the coolant manifold in thermally conductive proximity to the stator.

14. The method of claim 11, further comprising: electrically connecting a direct current (DC) power source to the first and second power terminals arranged on the machine housing.

15. The method of claim 14, further comprising: controlling the switch module to convert direct current from the DC power source to alternating current.

16. The method of claim 15, wherein controlling the switch module to convert direct current from the DC power source to alternating current includes forming a multi-phase alternating current.

\* \* \* \* \*